US008743998B2

(12) United States Patent
Kwon et al.

(10) Patent No.: US 8,743,998 B2
(45) Date of Patent: Jun. 3, 2014

(54) DEVICE FOR GENERATING CODEBOOK, METHOD FOR GENERATING CODEBOOK, AND METHOD FOR TRANSMITTING DATA

(75) Inventors: DongSeung Kwon, Daejeon (KR); Byung-Jae Kwak, Seoul (KR); Choongil Yeh, Daejeon (KR); Young Seog Song, Daejeon (KR); Ji Hyung Kim, Daejeon (KR); Wooram Shin, Daejeon (KR); Chung Gu Kang, Seoul (KR); Jin-Woo Kim, Seoul (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 245 days.

(21) Appl. No.: 13/061,630

(22) PCT Filed: Sep. 1, 2009

(86) PCT No.: PCT/KR2009/004899
§ 371 (c)(1),
(2), (4) Date: Mar. 1, 2011

(87) PCT Pub. No.: WO2010/024645
PCT Pub. Date: Mar. 4, 2010

(65) Prior Publication Data
US 2011/0150129 A1 Jun. 23, 2011

(30) Foreign Application Priority Data

Sep. 1, 2008 (KR) .................. 10-2008-0085927
Aug. 4, 2009 (KR) .................. 10-2009-0071799

(51) Int. Cl.
*H04L 27/00* (2006.01)
*H04B 7/06* (2006.01)
*H04L 1/18* (2006.01)
*H04L 1/06* (2006.01)

(52) U.S. Cl.
CPC ............ *H04L 1/1812* (2013.01); *H04B 7/0652* (2013.01); *H04B 7/0639* (2013.01); *H04L 1/06* (2013.01)
USPC ........... 375/295; 375/267; 375/299; 704/238; 370/203

(58) Field of Classification Search
None
See application file for complete search history.

(56) References Cited

U.S. PATENT DOCUMENTS 8,125,884 B1 * 2/2012 Li et al. ................. 370/203
2006/0161432 A1 * 7/2006 Zhang et al. .............. 704/238
(Continued)

FOREIGN PATENT DOCUMENTS

WO 2006/018710 2/2006
WO 2006/075220 7/2006
(Continued)

OTHER PUBLICATIONS

Samra et al., "Capacity and linear Precoding for Packet Retransmissions", IEEE International Conference on Acoustics, Speech, and Signal Processing, Mar. 2005, vol. 3, pp. 541-544.
(Continued)

*Primary Examiner* — Leon-Viet Nguyen
(74) *Attorney, Agent, or Firm* — Staas & Halsey LLP

(57) ABSTRACT

A device for generating a transmission codebook in a communication system including a multi-input multi-output (MIMO) antenna according to an embodiment of the present invention includes: a frequency determiner that determines a frequency to allow the transmission codebook to have an optimal characteristic; a precoding matrix generator that generates a precoding matrix on the basis of the frequency; and a codebook generator that generates a retransmission codebook to be used for retransmission on the basis of the precoding matrix and generates the transmission codebook on the basis of the retransmission codebook.

16 Claims, 2 Drawing Sheets

(56) References Cited

U.S. PATENT DOCUMENTS

| | | | |
|---|---|---|---|
| 2007/0297529 A1 | 12/2007 | Zhou et al. | |
| 2008/0198946 A1* | 8/2008 | Lee et al. | 375/299 |
| 2009/0046582 A1* | 2/2009 | Sarkar et al. | 370/230.1 |
| 2012/0057643 A1* | 3/2012 | Lin et al. | 375/267 |

FOREIGN PATENT DOCUMENTS

| | | |
|---|---|---|
| WO | 2008/004835 | 1/2008 |
| WO | 2008/100038 | 8/2008 |

OTHER PUBLICATIONS

Zheng et al., "Linear Space-Time Precoder with Hybrid ARQ Transmission", Proceedings of the IEEE Globecom 2007, Nov. 2007, pp. 3543-3547.

Sun et al., "Progressive linear Precoder Optimization for MIMO Packet Retransmissions", IEEE Journal on Selected Areas in Communication, Mar. 2006, vol. 24, No. 3, pp. 448-456.

Kwon et al., "Hybrid ARQ Schemes for IEEE 802.16m", IEEE 802.16 Broadband Wireless Access Working Group, Jul. 2008, pp. 1-10.

International Search Report mailed Jun. 6, 2012 issued in corresponding International Patent Application No. PCT/KR2009/004899.

Written Opinion of the International Searching Authority mailed Jun. 6, 2012 issued in corresponding International Patent Application No. PCT/KR2009/004899.

Haitong Sun et al., "Progressive Linear Precoder Optimization for MIMO Packet Retransmissions", IEEE Journal on Selected Areas in Communications, vol. 24, No. 3, Mar. 2006.

Extended European Search Report mailed Mar. 14, 2014 in corresponding European Application No. 09810250.2.

* cited by examiner

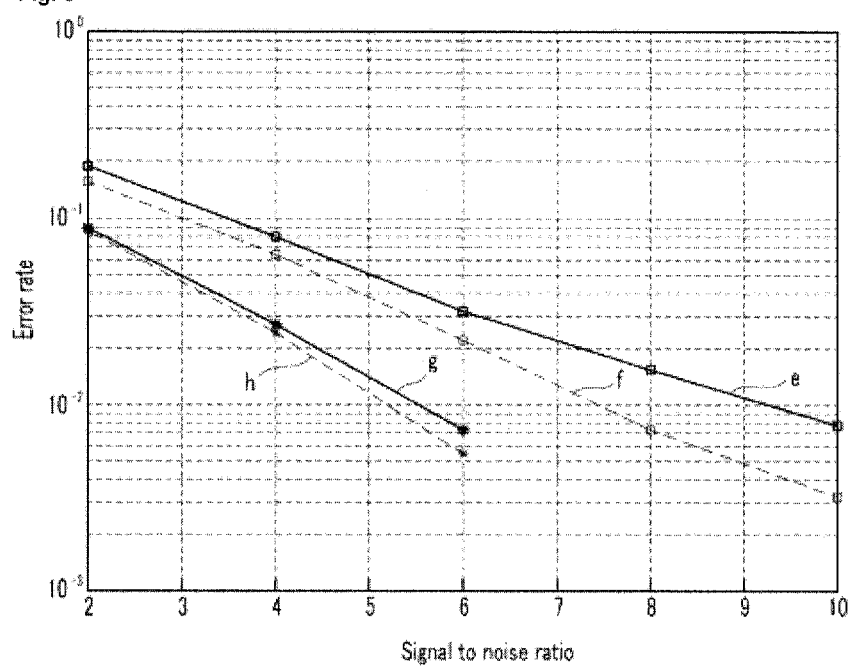

DEVICE FOR GENERATING CODEBOOK, METHOD FOR GENERATING CODEBOOK, AND METHOD FOR TRANSMITTING DATA

CROSS REFERENCE TO RELATED APPLICATIONS

This application claims the benefit under 35 U.S.C. Section 371, of PCT International Application No. PCT/KR2009/004899, filed Sep. 1, 2009, which claimed priority to Korean Application No. 10-2008-0085927, filed Sep. 1, 2008 and Korean Application No. 10-2009-0071799, filed Aug. 4, 2009, the disclosures of which are hereby incorporated by reference.

TECHNICAL FIELD

The present invention relates to a device for generating a codebook, a method for generating a codebook, and a method for transmitting data.

BACKGROUND ART

As wireless communication systems are being developed, the demand for improving speed thereof is increasing. In order to meet the demand, a wide frequency band needs to be used, but frequency resources are limited. As a result, as a method of transmitting more data while using the limited frequency band, a multi-input multi-output (MIMO) antenna technology is being used.

In the MIMO antenna technology, a precoding matrix selected in a codebook that is a set of a plurality of predetermined precoding matrices and a transmission signal vector are multiplexed and transmitted to a plurality of antennas. At this time, a receiving device selects a precoding matrix in the codebook on the basis of information on a state of a channel, and feeds back the selected precoding matrix to a transmitting device.

Meanwhile, a retransmission scheme of the wireless communication system includes a retransmission scheme in a medium access control (MAC) layer and a hybrid automatic retransmit request (HARQ) scheme integrating and using link performance of a physical layer. The HARQ scheme is a technology for recovering received data by combining retransmitted data with received information of previously transmitted data. In the HARQ scheme, the receiving device determines whether or not an error is generated in the reception signal by using, for example, a cyclic redundancy check (CRC) code. As the determination result, the receiving device transmits an acknowledge (ACK) message when no error is generated and transmits a negative acknowledge (NACK) message when an error is generated.

In the MIMO antenna technology, in the case of utilizing the codebook and adopting the HARQ, when the precoding matrix is selected in retransmission due to an initial transmission error in the same manner as the initial transmission, a diversity gain caused by the retransmission cannot be fully acquired. When the precoding matrix is selected in retransmission by utilizing reception information of the initial transmission, an optimum precoding matrix may be selected, but for this, information on the precoding matrix should be transmitted from the receiving device.

In order to maximize the retransmission diversity gain without receiving additional precoding matrix information from the receiving device, a set of the optimum precoding matrices needs to be generated.

The above information disclosed in this Background section is only for enhancement of understanding of the background of the invention and therefore it may contain information that does not form the prior art that is already known in this country to a person of ordinary skill in the art.

DISCLOSURE OF INVENTION

Technical Problem

The present invention has been made in an effort to create a codebook capable of securing optimum transmission efficiency at the time of retransmitting a signal vector due to a failure in initial transmission in a multi-input multi-output (MIMO) antenna technology.

Solution to Problem

An exemplary embodiment of the present invention provides a device for generating a transmission codebook in a communication system including a multi-input multi-output (MIMO) antenna, that includes: a frequency determiner that determines a frequency to allow the transmission codebook to have an optimal characteristic; a precoding matrix generator that generates a precoding matrix on the basis of the frequency; and a codebook generator that generates a retransmission codebook to be used for retransmission on the basis of the precoding matrix and generates the transmission codebook on the basis of the retransmission codebook.

The device may further include a storage unit that stores an initial codebook used for initial transmission.

The transmission codebook may be generated by concatenating the initial codebook and the retransmission codebook.

The precoding matrix may be an orthogonal matrix using an exponential function of a value found by dividing the frequency by the size of the transmission codebook as an element.

The retransmission codebook may be generated by multiplying the precoding matrix by a unitary matrix.

The frequency may be a frequency for maximally preventing an error of a signal received by a reception device of the communication system from being generated.

Another embodiment of the present invention provides a method for generating a transmission codebook in a device for generating a codebook in a communication system, that includes: determining a frequency to allow the transmission codebook to have an optimal characteristic; generating a precoding matrix on the basis of the optimal frequency; generating a retransmission codebook to be used for retransmission on the basis of the precoding matrix; and generating the transmission codebook on the basis of the retransmission codebook.

The method may further include storing an initial codebook used for initial transmission.

Generating the transmission codebook may include concatenating the initial codebook and the retransmission codebook.

The precoding matrix may be an orthogonal matrix using an exponential function of a value found by dividing the frequency by the size of the transmission codebook as an element.

Generating the retransmission codebook may include generating the retransmission codebook by multiplying the precoding matrix by a unitary matrix.

Yet another embodiment of the present invention provides a method for transmitting data in a transmission device of a communication system including a multi-input multi-output (MINO) antenna, that includes: multiplying a first precoding matrix by a transmission signal vector corresponding to the data and transmitting the multiplied transmission signal vector and first precoding matrix; receiving a retransmission request from a reception device; and multiplying a second precoding matrix by the transmission signal vector and transmitting the multiplied transmission signal vector and second precoding matrix, wherein the second precoding matrix is selected in a transmission codebook consisting of an initial codebook selected by the first precoding matrix and a retransmission codebook determined by considering the initial codebook.

The second precoding matrix may be generated on the basis of a frequency value so that a minimum distance of the transmission codebook becomes a maximum.

The second precoding matrix may be an orthogonal matrix using an exponential function of a value found by dividing the frequency by the size of the transmission codebook as an element.

The frequency may be a frequency for maximally preventing an error of a signal received by a reception device of the communication system from being generated.

The transmission codebook may be generated by concatenating the initial codebook and the retransmission codebook.

The retransmission codebook may be generated by multiplying the second precoding matrix by a unitary matrix.

The second precoding matrix may be received from the reception device.

Advantageous Effects of Invention

According to an embodiment of the present invention, in a MIMO antenna technology, it is possible to secure transmission efficiency by selecting an optimum precoding matrix at the time of retransmitting a signal vector due to a failure in initial transmission.

BRIEF DESCRIPTION OF DRAWINGS

FIG. 3 is a graph illustrating error rates according to a signal to noise ratio (SNR) when a precoding matrix selected in a codebook in the related art is adopted and when a precoding matrix selected in a codebook according to an embodiment of the present invention is adopted, in an environment with a spatial channel correlation.

MODE FOR THE INVENTION

Figure 1:
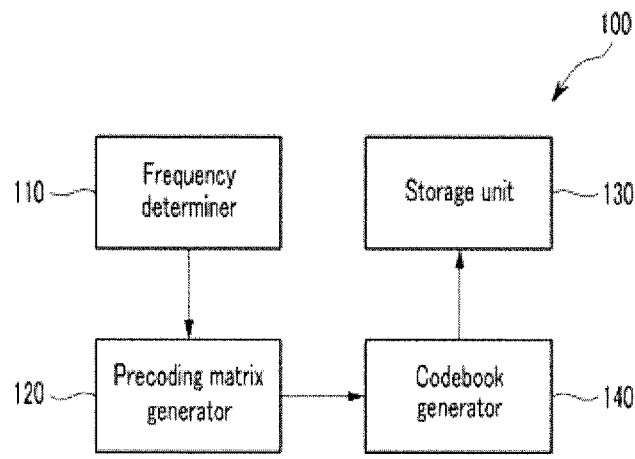
FIG. 1 is a schematic block diagram of a device for generating a codebook according to an embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

In the specification, unless explicitly described to the contrary, the word "comprise" and variations such as "comprises" or "comprising" will be understood to imply the inclusion of stated elements but not the exclusion of any other elements.

In the specification, a terminal may designate a mobile station (MS), a mobile terminal (MT), a subscriber station (SS), a portable subscriber station (PSS), user equipment (UE), an access terminal (AT), etc. and may include the entire or partial functions of the terminal, the mobile terminal, the subscriber station, the portable subscriber station, the user equipment, the access terminal, etc.

In the specification, a base station (BS) may designate an access point (AP), a radio access station (RAS), a node B, an evolved node B (eNodeB), a base transceiver station (BTS), a mobile multihop relay (MMR)-BS, etc., and may include the entire or partial functions of the AP, the RAS, the node B, the eNodeB, the BTS, the MMR-BS, etc.

Hereinafter, a device for generating a codebook and a method for generating a code book according to an embodiment of the present invention will be described in detail with reference to the accompanying drawings.

In a wireless communication system according to an embodiment of the present invention, a relationship between transmission and reception signal vectors can be expressed as shown in Equation 1.

$$y = \begin{bmatrix} y_1 \\ y_2 \\ \vdots \\ y_L \end{bmatrix} = \begin{bmatrix} H_1 F_1 \\ H_2 F_2 \\ \vdots \\ H_L F_L \end{bmatrix} s + \begin{bmatrix} w_1 \\ w_2 \\ \vdots \\ w_L \end{bmatrix} \quad \text{(Equation 1)}$$

$$= H_{CONC} s + w$$

Herein, $H_1, H_2, \ldots, H_L$ represent channel matrices in first, second, ..., L-th transmissions, $F_1, F_2, \ldots, F_L$ represent precoding matrices in first, second, L-th transmissions, $w_1, w_2,$ represent thermal noise vectors in first, second, ..., L-th transmissions, s represents a transmission signal vector, y represent reception signal vectors transmitted in first, second, ..., L-th transmissions, and Hconc represents an effective channel matrix.

Equation 1 can be expressed in a form in which the channel matrices are block-diagonalized as shown in Equation 2.

$$y = \begin{bmatrix} H_1 F_1 \\ H_2 F_2 \\ \vdots \\ H_l F_l \end{bmatrix} s + \begin{bmatrix} w_1 \\ w_2 \\ \vdots \\ w_l \end{bmatrix} \quad \text{(Equation 2)}$$

$$= \begin{bmatrix} H_1 & & & \\ & H_2 & & \\ & & \ddots & \\ & & & H_l \end{bmatrix} \begin{bmatrix} F_1 \\ F_2 \\ \vdots \\ F_l \end{bmatrix} s + \begin{bmatrix} w_1 \\ w_2 \\ \vdots \\ w_l \end{bmatrix}$$

The precoding matrices $F_1, F_2, \ldots, F_L$ expressed above are selected in a predetermined codebook. Therefore, a device for generating a codebook according to an embodiment of the present invention will be described in detail.

FIG. 1 is a schematic block diagram of a device for generating a codebook according to an embodiment of the present invention.

Referring to FIG. 1, the codebook generating device 100 includes a frequency determiner 110, a precoding matrix generator 120, a storage unit 130, and a codebook generator 140.

The frequency determiner 110 determines a frequency $$u_1, u_2, \ldots u_{N_T}$$

that allows the codebook generated in the codebook generator 100 to have an optimal characteristic.

The precoding matrix generator 120 generates a precoding matrix φ by using the frequency determined by the frequency determiner 110 and the size C of the codebook. The precoding matrix φ is expressed as shown in Equation 3.

$$\Phi = \text{diag}\left\{ \exp\left(j\frac{2\pi}{C}u_1\right) \exp\left(j\frac{2\pi}{C}u_2\right) \ldots \exp\left(j\frac{2\pi}{C}u_{N_T}\right) \right\} \quad \text{(Equation 3)}$$

Herein, "diag" represents a diagonal matrix and "exp" represents an exponential function. That is, the precoding matrix φ is a diagonal matrix using an exponential function of a value found by dividing the size C of the codebook by the optimal frequency $$u_1, u_2, \ldots, u_{N_T}$$

as an element.

The storage unit 130 stores a codebook (hereinafter referred to as "initial codebook") ($M_i$, i=1, 2, ..., c) used in initial transmission.

The codebook generator 140 receives the precoding matrix 1) from the precoding matrix generator 120, and generates a retransmission codebook ($M_{i,2}$, i=1, 2, ..., c) to be used for retransmission on the basis of the received precoding matrix φ. The retransmission codebook $M_{i,2}$ is expressed as shown in Equation 4.

$$M_{i,2} = \phi^{i-1} D \quad \text{(Equation 4)}$$

In Equation 4, D represents a predetermined unitary matrix. That is, the retransmission codebook $M_{i,2}$ is generated by multiplying the generated precoding matrix φ by the predetermined unitary matrix.

The codebook generator 140 generates a transmission codebook $U_i$ (i=1, 2, ..., c) by using the initial codebook M; and the retransmission codebook $M_{i,2}$ from the storage unit 130. The transmission codebook $U_i$ is expressed as shown in Equation 5.

$$\left\{ U_1 = \begin{bmatrix} M_1 \\ M_{1,2} \end{bmatrix}, U_2 = \begin{bmatrix} M_2 \\ M_{2,2} \end{bmatrix}, \ldots, U_C = \begin{bmatrix} M_C \\ M_{C,2} \end{bmatrix} \right\} \quad \text{(Equation 5)}$$

Referring to Equation 5, the transmission codebook $U_i$ is generated in a form in which the initial codebook $M_i$ and the retransmission codebook $M_{i,2}$ are concatenated with each other. A reception device (not shown) selects the retransmission codebook $M_{i,2}$ to be used for retransmission in accordance with the initial codebook $M_i$ used for the initial transmission in accordance with the transmission codebook $U_i$, and selects the precoding matrix in accordance with the retransmission codebook $M_{i,2}$.

Meanwhile, the frequency determiner 110 determines the frequency $$u_1, u_2, \ldots u_{N_T}$$

that allows the transmission codebook $U_i$ generated in the codebook generator 140 to have an optimal characteristic at the time of determining the frequency $$u_1, u_2, \ldots u_{N_T}$$

That is, the optimal frequency $$u_1, u_2, \ldots u_{N_T}$$

is the frequency $$u_1, u_2, \ldots u_{N_T}$$

for maximally preventing an error of the reception signal in the reception device from being generated.

Herein, the optimal frequency $$u_1, u_2, \ldots u_{N_T}$$

is determined to maximize a minimum distance $d_{min}$ of the transmission codebook $U_i$ generated in the codebook generator 140. The minimum distance is expressed as shown in Equation 6.

$$d_{min} = \min_{\substack{p,q \\ p \neq q}} \| U_p U_p^H - U_q U_q^H \|_2 \quad \text{(Equation 6)}$$

Hereinafter, referring to FIGS. 2 and 3, performance improvement when the precoding matrix generated in the codebook generating device according to the embodiment of the present invention is adopted will be described in detail.

Figure 2:
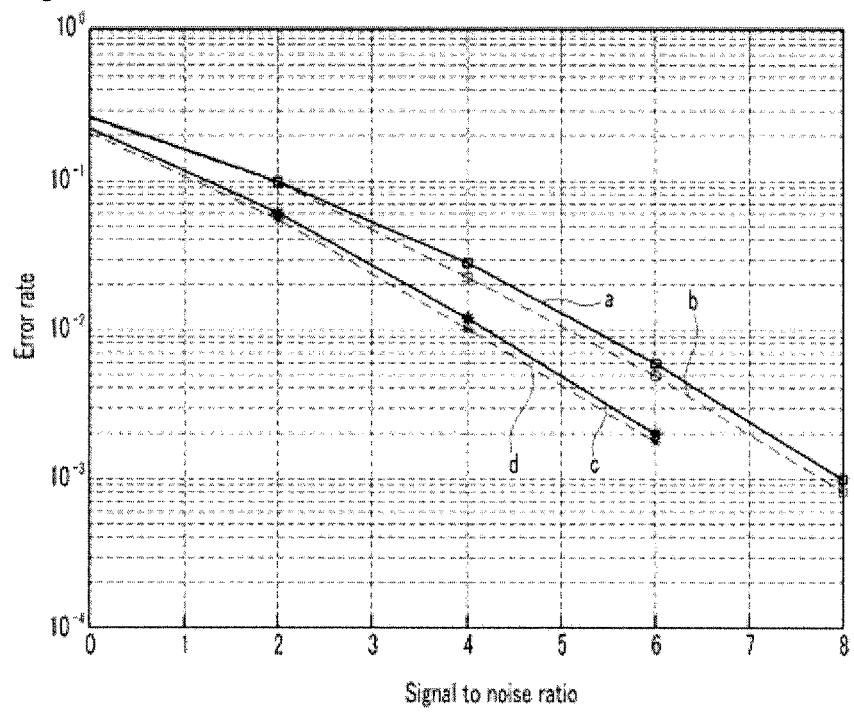
FIG. 2 is a graph illustrating error rates according to a signal to noise ratio (SNR) when a precoding matrix selected in a codebook in the related art is adopted and when a precoding matrix selected in a codebook according to an embodiment of the present invention is adopted, in an environment without a spatial channel correlation.

FIG. 2 is a graph illustrating error rates according to a signal to noise ratio (SNR) when a precoding matrix selected in a codebook in the related art is adopted and when a precoding matrix selected in a codebook according to an embodiment of the present invention is adopted, in an environment without a spatial channel correlation.

Referring to FIG. 2, error rates according to the SNR are illustrated when the precoding matrix selected in the code book in the related art is adopted in the case when a channel is not changed (a), when the precoding matrix selected in the codebook according to an embodiment of the present invention is adopted in the case when the channel is not changed (b), when the precoding matrix selected in the codebook in the related art is adopted in a channel environment in which a terminal moves at the speed of 3 km/h (c), and when the precoding matrix selected in the codebook according to an embodiment of the present invention is adopted in the channel environment in which the terminal moves at the speed of 3 km/h (d).

In both the case in which the channel is not changed and the case in which the channel is changed, the case when the precoding matrix selected in the codebook according to the embodiment of the present invention is adopted has a lower error rate than the case when the precoding matrix selected in the codebook in the related art is adopted in the same SNR.

FIG. 3 is a graph illustrating error rates according to a signal to noise ratio (SNR) when a precoding matrix selected in a codebook in the related art is adopted and when a precoding matrix selected in a codebook according to an embodiment of the present invention is adopted, in an environment with a spatial channel correlation.

Referring to FIG. 3, error rates according to the SNR are illustrated when the precoding matrix selected in the related art is adopted in the case when a channel is not changed (e), when the precoding matrix selected in the codebook according to an embodiment of the present invention is adopted in the case when the channel is not changed (f), when the precoding matrix selected in the codebook in the related art is adopted in a channel environment in which a terminal moves at the speed of 3 km/h (g), and when the preceding matrix selected in the codebook according to an embodiment of the present invention is adopted in the channel environment in which the terminal moves at the speed of 3 km/h (h).

In both the case in which the channel is not changed and the case in which the channel is changed, the case when the precoding matrix selected in the codebook according to the embodiment of the present invention is adopted has a lower error rate than the case when the precoding matrix selected in the codebook in the related art is adopted in the same SNR.

The above-mentioned exemplary embodiments of the present invention are not embodied only by an apparatus and method. Alternatively, the above-mentioned exemplary embodiments may be embodied by a program performing functions that correspond to the configuration of the exemplary embodiments of the present invention, or a recording medium on which the program is recorded.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

The invention claimed is:

1. A device for generating a transmission codebook in a communication system including a multi-input multi-output (MIMO) antenna, comprising: a frequency determiner that determines a frequency value to allow the transmission codebook to have an optimal characteristic; a precoding matrix generator that generates a precoding matrix on the basis of the determined frequency value; and a codebook generator that generates a retransmission codebook to be used for retransmission on the basis of the precoding matrix and generates the transmission codebook on the basis of the retransmission codebook, wherein the transmission codebook is generated in a form in which the initial codebook and the retransmission codebook are concatenated with each other, wherein the precoding matrix generator generates the precoding matrix defined as in the below Equation $$\Phi = \text{diag}\left\{ \exp\left(j\frac{2\pi}{C}u_1\right) \exp\left(j\frac{2\pi}{C}u_2\right) \ldots \exp\left(j\frac{2\pi}{C}u_N\right) \right\} \quad \text{[Equation]}$$

{$\phi$: the precoding matrix, diag{ }: a diagonal matrix, exp( ): an exponential function, C: the size of the transmission codebook, $u_1$~$u_N$: the determined frequency value, j: a constant}.

2. The device of claim 1, wherein the transmission codebook has the optimal characteristic when a minimum distance of the transmission codebook becomes a maximum.

3. The device of claim 1, further comprising a storage unit that stores an initial codebook used for initial transmission.

4. The device of claim 1, wherein the transmission codebook is generated in the form of the below Equation $$U = \begin{bmatrix} M_1 \\ M_2 \end{bmatrix} \quad \text{[Equation]}$$

{U: the transmission codebook, $M_1$: the initial codebook, $M_2$: the retransmission codebook}.

5. The device of claim 1, wherein the retransmission codebook is generated by multiplying the precoding matrix by a unitary matrix.

6. The device of claim 1, wherein the frequency is a frequency for maximally preventing an error of a signal received by a reception device of the communication system from being generated.

7. A method for generating a transmission codebook in a device for generating a codebook in a communication system including a multi-input multi-output (MIMO) antenna, comprising: determining a frequency value to allow the transmission codebook to have an optimal characteristic; generating a precoding matrix on the basis of the determined optimal frequency value; generating a retransmission codebook to be used for retransmission on the basis of the precoding matrix; and generating the transmission codebook on the basis of the retransmission codebook, wherein the transmission codebook is generated in a form in which the initial codebook and the retransmission codebook are concatenated with each other, wherein the precoding matrix is a matrix defined as in the below Equation $$\Phi = \text{diag}\left\{ \exp\left(j\frac{2\pi}{C}u_1\right) \exp\left(j\frac{2\pi}{C}u_2\right) \ldots \exp\left(j\frac{2\pi}{C}u_N\right) \right\} \quad \text{[Equation]}$$

{$\phi$: the precoding matrix, diag{ }: a diagonal matrix, exp( ): an exponential function, C: the size of the transmission codebook, $u_1$~$u_N$: the determined optimal frequency value, j: a constant}.

8. The method of claim 7, wherein the transmission codebook has the optimal characteristic when a minimum distance of the transmission codebook becomes a maximum.

9. The method of claim 7, further comprising storing an initial codebook used for initial transmission.

10. The method of claim 7, wherein the transmission codebook is generated in the form of the below Equation $$U = \begin{bmatrix} M_1 \\ M_2 \end{bmatrix} \quad \text{[Equation]}$$

{U: the transmission codebook, $M_1$: the initial codebook, $M_2$: the retransmission codebook}.

11. The method of claim 7, wherein generating the retransmission codebook includes generating the retransmission codebook by multiplying the precoding matrix by a unitary matrix.

12. A method for transmitting data in a transmission device of a communication system including a multi-input multi-output (MINO) antenna, comprising: multiplying a first precoding matrix by a transmission signal vector corresponding to the data and transmitting the multiplied transmission signal vector and first precoding matrix; receiving a retransmission request from a reception device; and multiplying a second precoding matrix by the transmission signal vector and transmitting the multiplied transmission signal vector and second precoding matrix, wherein the second precoding matrix is selected in a transmission codebook consisting of an initial codebook selected by the first precoding matrix and a retransmission codebook determined by considering the initial codebook, wherein the second precoding matrix is generated on the basis of a frequency value so that a minimum distance of the transmission codebook becomes a maximum, wherein the transmission codebook is generated in a form in which the initial codebook and the retransmission codebook are concatenated with each other, wherein the second precoding matrix is a matrix defined as in the below Equation $$\Phi = \text{diag}\left\{\exp\left(j\frac{2\pi}{C}u_1\right)\exp\left(j\frac{2\pi}{C}u_2\right)\ldots\exp\left(j\frac{2\pi}{C}u_N\right)\right\}$$ [Equation 5]

{$\phi$: the second precoding matrix, diag{ }: a diagonal matrix, exp( ): an exponential function, C: the size of the transmission codebook, $u_1 \sim u_N$: the frequency value, j: a constant}.

13. The method of claim 12, wherein the frequency is a frequency for maximally preventing an error of a signal received by a reception device of the communication system from being generated.

14. The method of claim 12, wherein the transmission codebook is generated in the form of the below Equation $$U = \begin{bmatrix} M_1 \\ M_2 \end{bmatrix}$$ [Equation 20]

{U: the transmission codebook, $M_1$: the initial codebook, $M_2$: the retransmission codebook}.

15. The method of claim 12, wherein the retransmission codebook is generated by multiplying the second precoding matrix by a unitary matrix.

16. The method of claim 12, wherein the second precoding matrix is received from the reception device.

* * * * *